(12) United States Patent
Kadle et al.

(10) Patent No.: US 8,695,404 B2
(45) Date of Patent: Apr. 15, 2014

(54) REFRIGERANT LEAK DETECTION SYSTEM

(75) Inventors: Prasad S. Kadle, Williamsville, NY (US); Mahmoud Ghodbane, N. Tonawanda, NY (US)

(73) Assignee: Delphi Technologies, Inc., Troy, MI (US)

( * ) Notice: Subject to any disclaimer, the term of this patent is extended or adjusted under 35 U.S.C. 154(b) by 237 days.

(21) Appl. No.: 13/130,684

(22) PCT Filed: Nov. 25, 2009

(86) PCT No.: PCT/US2009/065829
§ 371 (c)(1),
(2), (4) Date: Jul. 27, 2011

(87) PCT Pub. No.: WO2010/062923
PCT Pub. Date: Jun. 3, 2010

(65) Prior Publication Data
US 2011/0277541 A1     Nov. 17, 2011

Related U.S. Application Data

(60) Provisional application No. 61/117,992, filed on Nov. 26, 2008.

(51) Int. Cl.
*G01M 3/04*      (2006.01)
(52) U.S. Cl.
USPC .......................................... 73/49.2; 73/49.7

(58) Field of Classification Search
USPC .................... 73/40, 40.7, 49.2, 49.7
See application file for complete search history.

(56) References Cited

U.S. PATENT DOCUMENTS

| | | | |
|---|---|---|---|
| 4,875,359 A * | 10/1989 | Akiba | 73/40 |
| 4,896,052 A | 1/1990 | Morrison et al. | |
| 4,987,749 A | 1/1991 | Baier | |
| 5,264,368 A * | 11/1993 | Clarke et al. | 436/3 |
| 5,522,229 A | 6/1996 | Stuchlik, III et al. | |
| 5,681,984 A | 10/1997 | Cavestri | |
| 5,918,475 A | 7/1999 | Sakakibara et al. | |
| 6,907,748 B2 | 6/2005 | Kadle et al. | |
| 7,191,649 B1 | 3/2007 | Coogle | |
| 2002/0117296 A1 | 8/2002 | Smith et al. | |
| 2002/0178738 A1 | 12/2002 | Taira et al. | |
| 2007/0057675 A1* | 3/2007 | Yamane et al. | 324/438 |
| 2008/0173088 A1* | 7/2008 | Quill | 73/323 |

* cited by examiner

*Primary Examiner* — Hezron E Williams
*Assistant Examiner* — David Z Huang
(74) *Attorney, Agent, or Firm* — James M. Chan

(57) ABSTRACT

A refrigerant leak detection system is provided for a motor vehicle, in which the system includes a heating, ventilating, and air conditioning (HVAC) module having a refrigerant sensor assembly adapted to be fixed within the drain hole of the sump. The refrigerant sensor assembly includes an elongated sensor element extending into the sump, a flange portion having apertures that allows the condensate to drain from sump, a collar portion with self-tapping threads.

6 Claims, 2 Drawing Sheets

REFRIGERANT LEAK DETECTION SYSTEM

CROSS REFERENCE TO RELATED APPLICATION

This application claims the benefit of U.S. Provisional Patent Application Ser. No. 61/117,992 for a REFRIGERANT DETECTION SYSTEM, filed on Nov. 26, 2008, which is hereby incorporated by reference in its entirety. This claim is made under 35 U.S.C. §119(e); 37 C.F.R. §1.78; and 65 Fed. Reg. 50093.

TECHNICAL FIELD OF INVENTION

The invention relates to a refrigerant leak detection system for a motor vehicle; more particularly to a HVAC module having a refrigerant sensor assembly for detecting refrigerant vapors that are heavier than air.

BACKGROUND OF INVENTION

A typical motor vehicle air conditioning system includes a compressor, a condenser, an expansion device, and an evaporator. The condenser is disposed in the front portion of the engine compartment or more precisely, in front of the radiator exposed to the outside ambient air. The evaporator is disposed within a heating, ventilating, and air conditioning (HVAC) module that conditions and distributes air to the passenger compartment of the motor vehicle. Hydraulically connecting the aforementioned components are series of refrigerant tubes that are capable of conveying a two phase refrigerant operating under high and low pressure flows. The compressor is commonly referred to as the heart of the air conditioning system in which it is responsible for compressing and transferring the refrigerant throughout the system. Heat energy from the passenger cabin is absorbed by the refrigerant flowing through the evaporator. The compressor then transfers the refrigerant to the condenser where the heat energy is dispelled to the ambient air outside of the vehicle.

CFC-12 and other chlorofluorocarbon (CFC) refrigerants have been widely used in motor vehicle conditioning systems for over 30 years. The CFC refrigerants, having a vapor density less that air, rise to the stratosphere where the halogen atoms of the CFC react with the ozone, thereby breaking down the protective ozone layer. As a result, over 190 countries have signed a treaty, called the Montreal Protocol, which calls for the ending of the production of CFC refrigerants for air conditioning and refrigeration uses on Dec. 31, 1995.

The United States Environmental Protection Agency (EPA) has determined several alternative refrigerants that are acceptable for use as a CFC refrigerant replacement in motor vehicle air conditioning systems, subject to certain use conditions. The decisions for these alternative refrigerants were based on their ozone-depleting, global warming, flammability, and toxicity characteristics. A number of these identified alternative refrigerants have a vapor density that is heavy than air. If a leak occurs in the air conditioning system within the hood of the motor vehicle, the heavier refrigerant vapor would settle to the lowest point within the engine compartment and dissipates to the environment. However, if a leak occurred within the evaporator or a portion of the refrigerant line that is contained within the HVAC module, the heavier vapors could potentially be dispersed into the passenger compartment.

U.S. Pat. No. 6,907,748 discloses a refrigerant leak detector positioned within the passenger compartment or within the HVAC module downstream of the evaporator as part of a system for the detection and venting of refrigerant leaks. If the refrigerant sensor was positioned within the passenger compartment, the sensor would be dependent on the blower to convey the leaked refrigerant to the sensor. For small leaks, the large amount of air flow may dilute the concentration of the refrigerant vapor below the detectable threshold of the refrigerant sensor. If the refrigerant sensor was positioned within the HVAC module and sensor failure occurs, the entire module would need to be disassembled to repair or replace the sensor. Furthermore, if a heavier than air refrigerant is utilized, any leaks would settle and collect in a low-lying area of the HVAC module and avoid detection until enough refrigerant is leaked to overfill the low-lying area.

There is a need to have a refrigerant detection system that can detect refrigerants having a vapor density heavier than air. There is a further need to have a refrigerant leak detection system in which the refrigerant leak detection sensor is readily accessible for servicing. There is a still a further need for a refrigerant leak detection system that can monitor for refrigerant leaks during periods when the blower is not in operation.

SUMMARY OF THE INVENTION

An embodiment of the present invention provides for a refrigerant leak detection system for a motor vehicle. The system includes an HVAC module having a refrigerant sensor assembly disposed within a low-lying portion of the HVAC module, preferably within the condensate sump, to detect refrigerants having a vapor density heavier than air. Preferably, the refrigerant sensor assembly is fixedly inserted into the drain hole of the condensate sump for ease of access. The refrigerant sensor assembly includes an elongated sensor element extending above any accumulated condensate within the sump. The elongated sensor element is joined to a sensor mount having a flange portion which is integrally attached to a substantially cylindrical collar portion. The flange portion defines drainage ports that allow the condensate to drain from the condensate sump. The substantially cylindrical collar portion includes an end extending from the HVAC module and having a lip for the attachment of a one-way valve. The substantially cylindrical collar portion also includes self-tapping threads to attach the refrigerant sensor assembly onto the wall of the drain hole of the HVAC module.

An advantage of the preferred embodiment of the leak detection system is that the refrigerant sensor assembly is in a location that allows it to detect refrigerants that have a vapor density heavier than air. Another advantage is that the refrigerant sensor assembly is in a location that is readily assessable. Still another advantage is that the refrigerant sensor assembly can be easily installed and uninstalled into the drain hole the HVAC module.

Further features and advantages of the invention will appear more clearly on a reading of the following detailed description of an embodiment of the invention, which is given by way of non-limiting example only and with reference to the accompanying drawings.

BRIEF DESCRIPTION OF DRAWINGS

This invention will be further described with reference to the accompanying drawings in which.

DETAILED DESCRIPTION OF INVENTION

Figure 1:
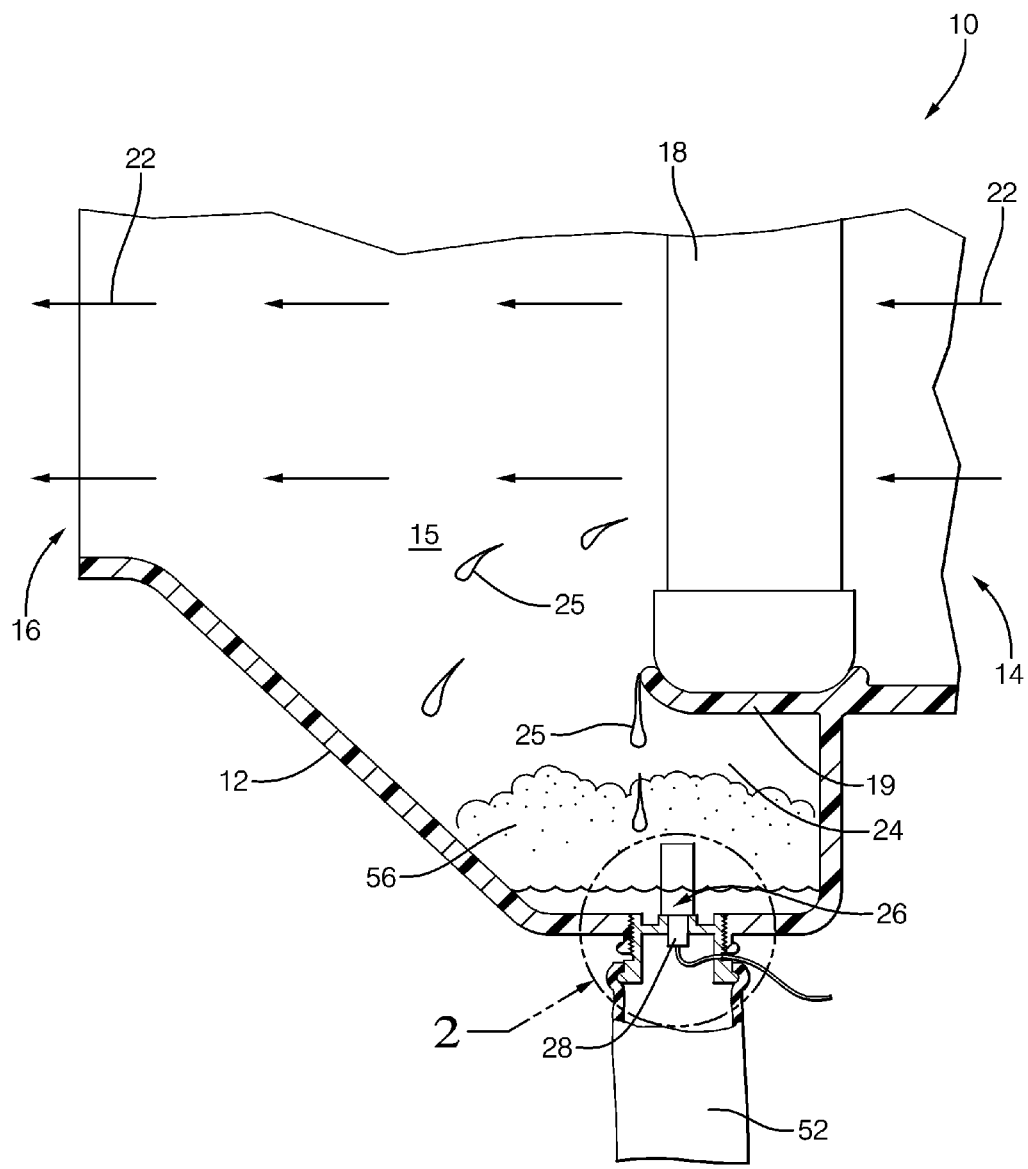
FIG. 1 is a cross sectional view of a refrigerant leak detection system that includes a heating, ventilating, and air conditioning (HVAC) module having a refrigerant sensor assembly positioned within the condensate sump.
Figure 2:
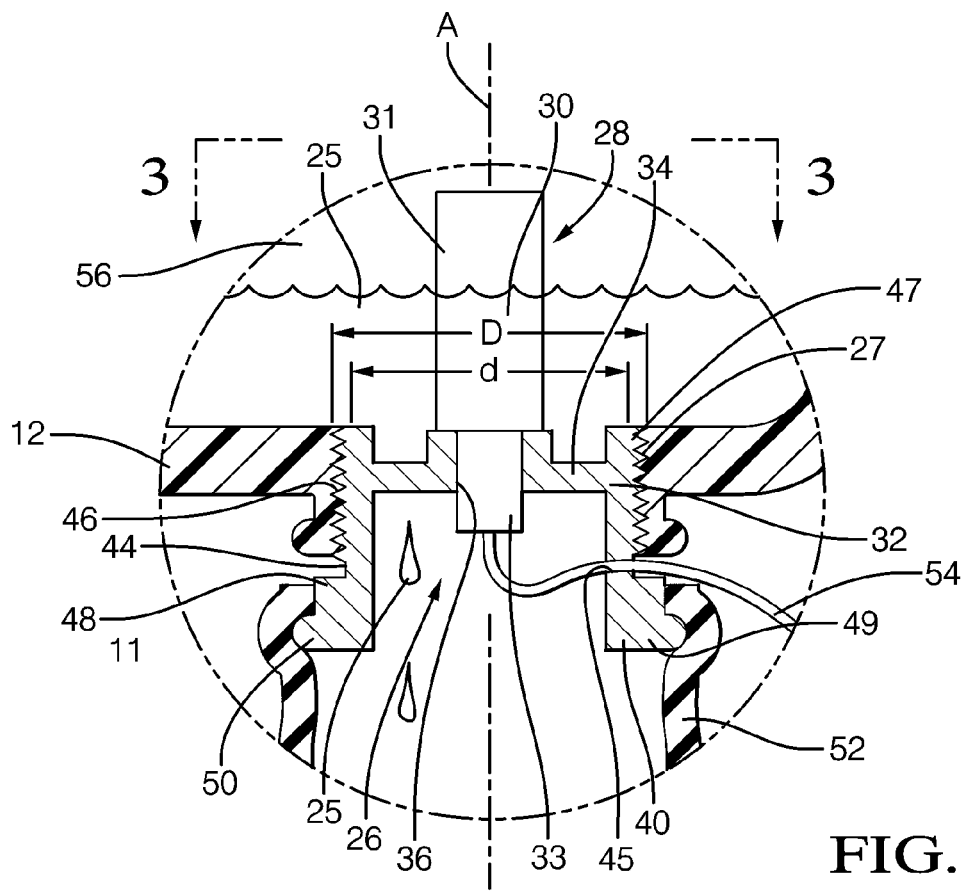
FIG. 2 is a detailed cross sectional view of the refrigerant sensor assembly of FIG. 1 disposed within a drain hole of the condensate sump.
Figure 3:
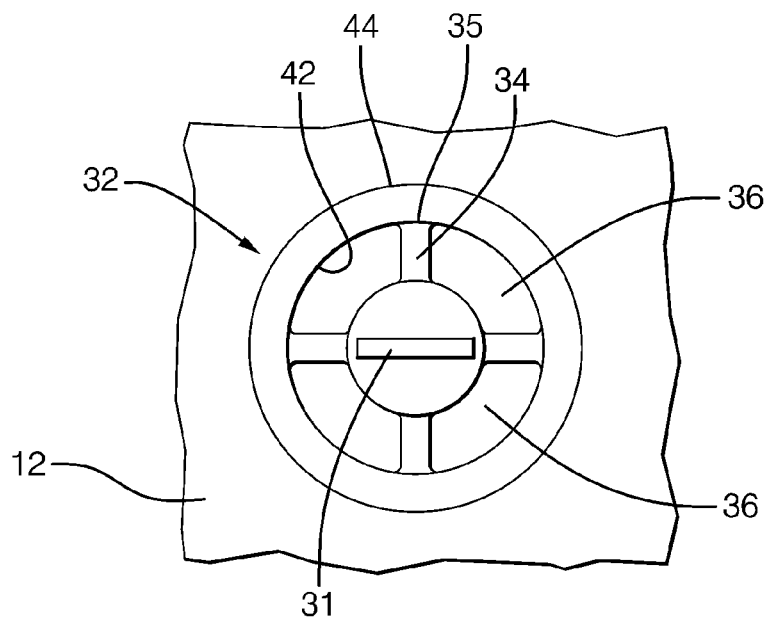
FIG. 3 is a detailed top view of the refrigerant sensor assembly of FIG. 2.

In accordance with a preferred embodiment of this invention, referring to FIGS. 1 through 3 is a refrigerant leak detection system 10 that includes a heating, ventilating, and air conditioning (HVAC) module 12 having a condensate sump 24 with a drain hole 26 and a refrigerant sensor assembly 28 positioned within the drain hole 26. The refrigerant sensor assembly 28 is adapted to fixedly engage itself within the drain hole 26 of the HVAC module 12 and to allow for drainage of condensate from the condensate sump 24.

A typical HVAC module 12 includes an air inlet 14 for drawing in unconditioned air, a labyrinth of passageways 15 for directing air flow throughout the HVAC module 12, and an air outlet 16 for distributing conditioned air to the passenger compartment. Air flow doors (not shown) are positioned at strategic junctures through the passageways 15 in order to selectively direct and proportion an amount of air flow to heat exchangers within the HVAC module 12 to control the temperature of the air flow to the passenger compartment. The heat exchangers include a heater core (not shown) for heating the air flow and an evaporative 18 for cooling the air flow. Air flow is induced through the HVAC module by a blower (not shown) that may be integrated with the HVAC module 12.

Shown in FIG. 1, is a partial cross sectional view of the lower portion of an HVAC module 12. The HVAC module 12 contains an evaporator 18, which is mounted upon a support member 19 within an air passageway 15. The direction of air flow 22 through the air passageway 15 is shown by the large arrows in FIG. 1. The HVAC module 12 includes a condensate sump 24 that is located downstream from the evaporator 18. The condensate sump 24 is preferably located, with respect to gravity, at or near a low-lying area of the HVAC module 12 and is in hydraulic communication with the passageway 15 in which the evaporator 18 resides and includes at least one condensate drain hole 26.

In reference to FIG. 2, a refrigerant sensor assembly 28 is adapted to be inserted through and fixedly positioned within the drain hole 26 without obstructing the drainage of condensate 25. The refrigerant detection sensor assembly 28 includes an elongated sensor element 30 extending along an axis A. The sensor element 30 is engaged to a sensor mount 32 that includes a flange portion 34 and a substantially cylindrical collar portion 40. The flange portion 34 defines an aperture through which the sensor element 30 is inserted into and securely joined. The sensor element 30 may be joined to the flange portion 34 by interference fit, mechanical engagement, adhesives compounds, or any other means known in the art to ensure that the sensor element 30 is securely attached onto the flange portion 34. Best shown in FIG. 3, the flange portion 34 is substantially disked shaped having a peripheral edge 35 and defines at least one drained port 36 to allow for condensate 25 to pass through with minimum obstruction.

The substantially cylindrical collar portion 40 includes an inner surface 42 oriented toward the axis A. The inner surface 42 engages the peripheral edge 35 of the flanged portion 34 to form a single integral piece sensor mount 32. The substantially cylindrical collar portion 40 also includes an outer surface 44 oriented away from the axis A. The outer surface 44 includes means to be attached to the side wall 27 of the drain hole 26 and removed when necessary. Means such as self tapping threads 46 are preferable and would allow the refrigerant sensor assembly 28 to be fixed within the drain hole 26 and unfixed for servicing or replacing.

FIG. 2 shows the refrigerant sensor assembly 28 having a sensor mount 32 with self tapping threads 46 with an outer diameter "D" that is sized slightly larger than the diameter "d" of the drain hole. The refrigerant sensor assembly 28 is axially aligned and inserted into the drain hole 26. The self-tapping threads 46 allow the refrigerant sensor assembly 28 to be screwed into and fixedly attached to the side wall 27 of the drain hole 26. The self-tapping threads 26 will also allow the removal of the refrigerant sensor assembly. It should be noted that varying sized outer diameter "D" can be selected to account for varying diameter "d" of drain holes of HVAC modules available in the market.

The collar portion 36 also includes a first end 47 and a second end 49 axially spaced from the first end 47. The second end 49 includes a shoulder 48 and a radially extending lip 50. Attached to the lip 50 is a one way valve 52, such as that of a duckbill valve.

As the refrigerant expands within the evaporator 18, heat is extracted from the warm moist air flow 22 through the external surface of the evaporator, thereby reducing the temperature of the air flow 22 below its dew point. As the air is cooled, moisture within the air flow 22 condenses onto the evaporator 18. The condensate 25 then drips down or carried by the air flow 22 through the passageway 15 into the condensate sump 24. The condensate 25 accumulates within the condensate sump 24 and until the weight of the condensate within the condensate sump acts upon the one way valve 52 and forces it open. The drained port 36 of the flange portion 34 allows for the condensate 25 to pass through the refrigerant sensor assembly 28 and drain through the one way valve 52 to the environment.

The elongated sensing element 30 includes a first end 31 that extends into the condensate sump 24 above the accumulated nominal condensate level. The sensing element 30 may be that of any sensor available in the art capable of detecting the presence of a refrigerant. Extending axially opposed from the first end 31 is a second end 33 from which electrical wires 54 protrudes. The cylindrical collar portion 40 includes a wire aperture 45 through which the electrical wires 54 are threaded through to avoid interfering with the operation of the one way valve 52.

When a refrigerant leak occurs within the HVAC module, the heavier than air refrigerant vapor 56 would normally settle under gravity to the lowest point of the HVAC module, which in this instance would be the condensate sump 24. The refrigerant sensor assembly 28 would detect the presence of the refrigerant and sends a signal to an alarm module (not shown). The alarm module would then activate an alarm, visual or audio, and may activate a purge valve if it is desired to vent the refrigerant to the ambient air; thereby, reducing or eliminating the potential of the refrigerant entering the passenger compartment. A refrigerant venting system is described in U.S. Pat. No. 6,907,748, which discloses an air conditioning system having a blow-off valve for simultaneously venting refrigerants in the liquid and suction lines in response to a refrigerant leakage-warning signal. Constant power may be supplied to the refrigerant sensor assembly 28 to detect refrigerant leaks when the vehicle is not in operation.

An advantage of the preferred embodiment of the leak detection system 10 is that the refrigerant sensor assembly 28 is in a location that allows it to detect refrigerants that have a vapor density heavier than air. Another advantage is that the refrigerant sensor assembly 28 is in a location that is readily assessable. Still another advantage is that the refrigerant sensor assembly 28 can be easily installed and uninstalled into the drain hole the HVAC module.

The invention has been described in an illustrative manner and it is to be understood that the terminology which has been used is intended to be in the nature of words of description rather that of limitation. For example, it should be appreciated by those skilled in the art that the particular HVAC module embodiment disclosed is intended to be generic in nature and those skilled in the art will appreciate that the subject invention may be adapted for modules wherein the relative positions of the various component i.e. evaporator, heater core, etc, varies from that specifically disclosed or may have additional or fewer components included therein. While this invention has been described in terms of the preferred embodiments thereof, it is not intended to be so limited, but rather only to the extent set forth in the claims that follow.

Having described the invention, it is claimed:

1. A refrigerant leak detection system for a motor vehicle, comprising a:

HVAC module having a condensate sump having a side wall disposed about an axis defining a drain hole; and a refrigerant sensor assembly partially inserted into said condensate sump through said drain hole, said refrigerant sensor assembly includes:

a sensor element having a refrigerant detection end extending into said condensate sump and an opposing mounting end, a flange portion radially extending from said mounting end and defining at least one drain port configured to allow for condensate to pass through the refrigerant sensor assembly, a cylindrical collar portion having an interior wall engaged with said flange portion and an exterior wall opposite that of said interior wall, wherein said exterior wall includes means to securely engage said cylindrical collar portion to side wall, thereby securing said refrigerant sensor assembly to said HVAC module.

2. The refrigerant leak detection system of claim 1, wherein said sensor element is positioned at an elevation higher than said mounting end with respect to the direction of gravity.

3. The refrigerant leak detection system of claim 2, wherein said means to securely engage said side wall of said hole includes self-tapping threads.

4. The refrigerant leak detection system of claim 3, further includes a one way valve attached to an end of said substantially cylindrical collar portion axially spaced from said HVAC module.

5. The refrigerant leak detection system of claim 3, wherein said sensor element includes a least one electrical wire extending from said mounting end and wherein said cylindrical collar portion defines a passage for said electrical wire to pass through.

6. The refrigerant leak detection system of claim 1, further including an evaporator disposed within one of said passageways upstream of said condensate sump, whereby refrigerant leaks from said evaporator is conveyed to said condensate sump by air flow through said passageway.

* * * * *